US012607477B2

(12) United States Patent
Arora et al.

(10) Patent No.: US 12,607,477 B2
(45) Date of Patent: Apr. 21, 2026

(54) INTELLIGENT RIDE MONITORING IN A FLEET ROUTING SYSTEM

(71) Applicant: ZUM SERVICES, INC., Redwood City, CA (US)

(72) Inventors: Himanshu Arora, Redwood City, CA (US); Rashmi Choudhary, Redwood City, CA (US); Abhishek Garg, Redwood City, CA (US); Kanstantsin Gerasimovich, Redwood City, CA (US); Rohit Jain, Redwood City, CA (US); Alexey Kononov, Redwood City, CA (US); Sidi Liu, Redwood City, CA (US); Andrew Mormysh, Redwood City, CA (US); Shiva Nagabushanaswamy, Redwood City, CA (US); Sreejith Nair, Redwood City, CA (US); Niket Sanghvi, Redwood City, CA (US); Melissa Shiu, Redwood City, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/212,392

(22) Filed: Jun. 21, 2023

(65) Prior Publication Data

US 2024/0426627 A1     Dec. 26, 2024

(51) Int. Cl.
G01C 21/36 (2006.01)
(52) U.S. Cl.
CPC ....... G01C 21/367 (2013.01); G01C 21/3676 (2013.01); G01C 21/3697 (2013.01)
(58) Field of Classification Search
CPC .............. G01C 21/367; G01C 21/3676; G01C 21/3697
See application file for complete search history.

(56) References Cited

U.S. PATENT DOCUMENTS

| 12,093,508 | B1 * | 9/2024 | Chen | ..................... | G01C 21/343 |
| 2006/0095277 | A1 * | 5/2006 | Noonan | .................. | G06Q 99/00 |
| | | | | | 235/375 |

(Continued)

FOREIGN PATENT DOCUMENTS

| JP | 2021131651 A | 9/2021 |
| KR | 101867753 B1 | 6/2018 |

(Continued)

OTHER PUBLICATIONS

PCT/US2024/032805, "International Search Report and Written Opinion", Sep. 25, 2024, 10 pages.

*Primary Examiner* — Erin M Piateski
*Assistant Examiner* — Gabriel Joseph Rene Lambert
(74) *Attorney, Agent, or Firm* — Kilpatrick Townsend & Stockton LLP

(57) ABSTRACT

A system and method include a server device which transmits a list of passengers for a vehicle route. The list of passengers may include profiles for each one of the passengers. The server device may further receive a unique identification for a passenger boarding a vehicle and compare the unique identification to the list of passengers for the vehicle route. The server device may further identify the passenger boarding the vehicle as being on board the vehicle in the profile for that passenger. The server device may further receive vehicle status information from the vehicle and transmit driver navigational information to a driver device. The server device may further transmit real time tracking data to a user device, including a map with an indicator of a current location of the vehicle.

20 Claims, 6 Drawing Sheets

(56)     References Cited

U.S. PATENT DOCUMENTS

| | | | | |
|---|---|---|---|---|
| 2014/0114565 A1* | 4/2014 | Aziz | .................. | G01C 21/3632 |
| | | | | 701/428 |
| 2014/0210650 A1* | 7/2014 | Kim | ...................... | G08G 1/133 |
| | | | | 340/994 |
| 2015/0262006 A1* | 9/2015 | Yomogida | .......... | G06Q 30/0272 |
| | | | | 705/14.62 |
| 2018/0279097 A1* | 9/2018 | Shen | ................. | G06Q 10/0631 |
| 2019/0114563 A1* | 4/2019 | Yukimoto | ................ | G07C 9/00 |
| 2020/0065722 A1* | 2/2020 | Smith | ................... | H04W 4/023 |
| 2020/0104965 A1* | 4/2020 | Ramot | ................... | G08G 1/202 |
| 2020/0219017 A1* | 7/2020 | Simpson | ............ | G01C 21/3438 |
| 2020/0260217 A1* | 8/2020 | Choi | ..................... | H04W 4/023 |
| 2020/0311843 A1* | 10/2020 | Park | .................... | G06K 7/1417 |
| 2021/0374623 A1* | 12/2021 | Dyer | ...................... | G01C 21/26 |
| 2022/0343248 A1* | 10/2022 | Niklaus | .................. | G08G 1/202 |
| 2022/0413497 A1 | 12/2022 | Hicok et al. | | |

FOREIGN PATENT DOCUMENTS

| | | |
|---|---|---|
| KR | 20200132437 A | 11/2020 |
| KR | 20220003398 A | 1/2022 |

* cited by examiner

NAME: JESSICA BROWN
GRADE: 3
SCHOOL: ANZA ELEMENTARY
PARENT: JANE BROWN
PHONE: 555-555-5555

ON BOARD ☒
NOT BOARDED ☐
ON HOLD ☐

INTELLIGENT RIDE MONITORING IN A FLEET ROUTING SYSTEM

TECHNICAL FIELD

The present application discloses a system for routing a fleet of vehicles, scheduling stops, and optimizing those routes and stops based on one or more elements of primary concern. In particular, the present application teaches a system which monitors elements of a ride for the purpose of ensuring ride security, correct ridership, and communicates those elements to different users for monitoring and prediction purposes.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis. Those costs may include pollution due to emissions, fuel costs, driver costs, costs in time, and others. Current solutions are not only inefficient but wasteful and contribute to cumulative emissions based environmental harm. Optimization is needed to reduce financial, pollution, and time costs in fleet vehicle use and routing.

It is, therefore, one object of this disclosure to provide a user interface that facilitates a routing system which optimizes routes for fleet vehicles. It is another object of this disclosure to provide a system that tracks elements or characteristics of a particular ride for ride security, correct ridership (or goods) and communicates those elements to different users for monitoring and prediction purposes.

SUMMARY OF THE DISCLOSURE

A system and method include a server device which transmits a list of passengers for a vehicle route. The list of passengers may include profiles for each one of the passengers. The server device may further receive a unique identification for a passenger boarding a vehicle and compare the unique identification to the list of passengers for the vehicle route. The server device may further identify the passenger boarding the vehicle as being on board the vehicle in the profile for that passenger. The server device may further receive vehicle status information from the vehicle and transmit driver navigational information to a driver device. The server device may further transmit real time tracking data to a user device, including a map with an indicator of a current location of the vehicle.

A method is provided which includes transmitting, by a server device, a list of passengers for a vehicle route to a driver device. The list of passengers may include profiles for each one of the passengers. The method further includes receiving, by the server device, a unique identification for a passenger boarding a vehicle. The method further includes comparing, by the server device, the unique identification to the list of passengers for the vehicle route. The method further includes identifying, by the server device, the passenger boarding the vehicle as being on board the vehicle in the profile for that passenger. The method further includes receiving, by the server device, vehicle status information from the vehicle via the driver device. The method further includes transmitting, by the server device, driver navigational information to the driver device. The method may also include transmitting, by the server device, real time tracking data to a user device, the real time tracking data including a map with an indicator of a current location of the vehicle.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
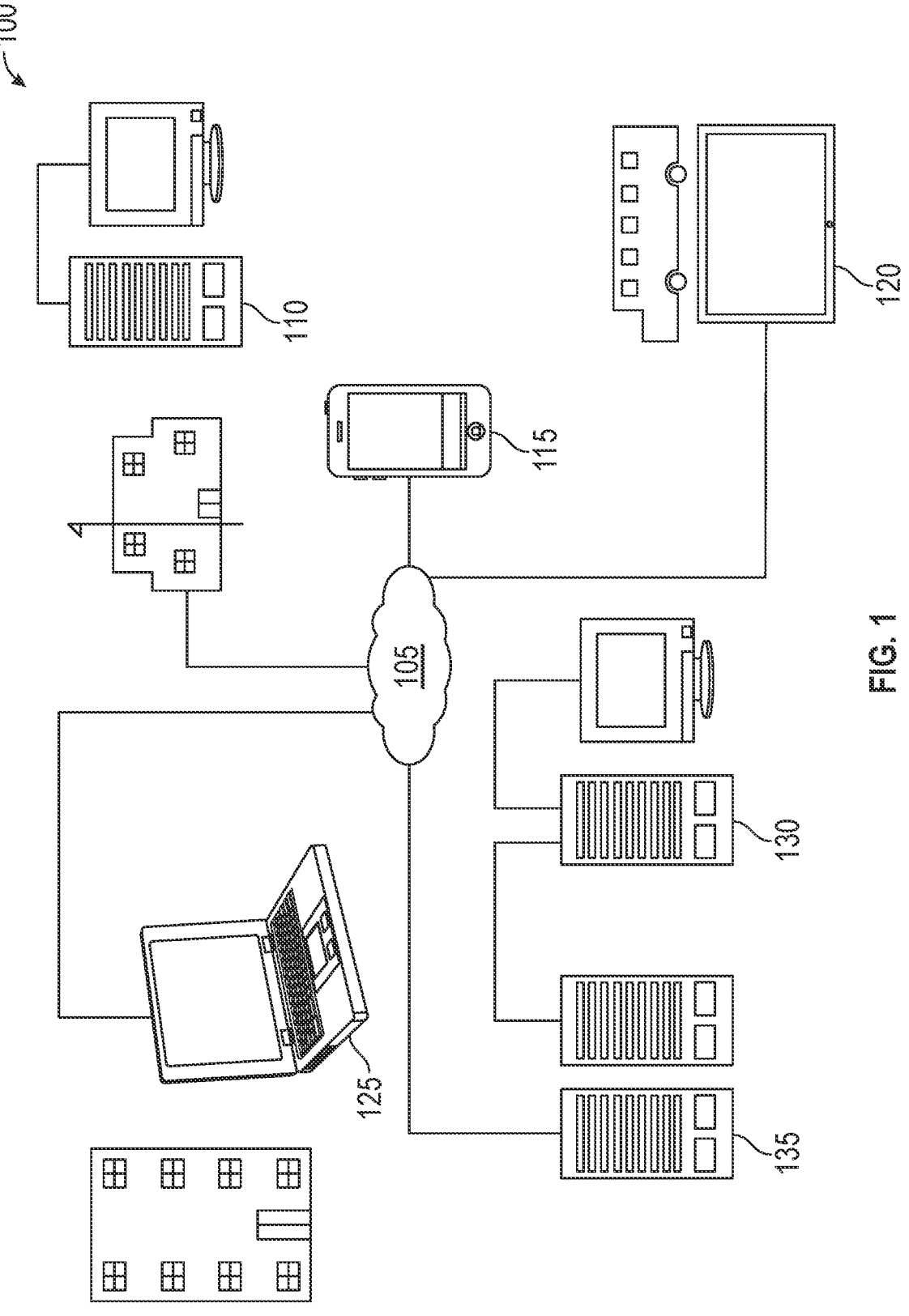
FIG. 1 illustrates box diagram of a fleet routing system.

FIG. 1 illustrates a box diagram of a fleet routing system 100. Fleet routing system may be implemented by use of a communications network 105 such as the Internet, which facilitates the exchange of information between various devices within fleet routing system 100. Fleet routing system may be used with any fleet but is described with respect to a fleet of school buses. The techniques disclosed herein may be used to deliver passengers or goods with little or no modification. Fleet routing system 100 may be implemented between a ride requestor device, such as a school device 110 (and/or an administration level device 125, which will be discussed below) and a user device 115, and a driver device 120 associated with a bus driver, for example. Fleet routing system 100 may be implemented by an administrator device 125. A provider may provide the administrator device 125 or the ride requestor device 110 with access to fleet routing system 100 by use of servers 135 and provider device 130. In one implementation, a school district may use administration level device 125 which provides buses to pick up and deliver children to a school and operate in a manner similar to ride requestor device 110. In other embodiments, ride requestor device 110 may be implemented to schedule routing for bus routes for a particular school. In other words, various levels of administration may access and implement fleet routing system 100 according to their particular needs for the delivery of passengers.

At the outset, a provider device 130 may give a ride requestor device 110 or an administrator level device 125 access to fleet routing system 100 by servers 135 to create bus routing for a particular school district or school as appropriate. Servers 135 may provide a user interface to ride requestor device 110 or an administrator level device 125 to create routes for each child in the district or school as appropriate. For example, a profile may be created for each child in the district or school as appropriate to be stored in non-volatile non-transitory storage media, which includes a home address for each child. In response, fleet routing system 100 may determine a distance between identified stops and a travel time between each of those identified stops to determine both a single bus route and a number of buses required for a necessary number of routes. For example, based on a standard bus configuration, a school bus may transport 80 seated students. However, due to time and distance constraints, a certain bus may only be able to pick up 45 students at identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In one embodiment, fleet routing system 100 may optimize routes based on the shortest time on the road for each bus, based on minimal fuel usage across the fleet, based on minimal emissions across the fleet, based on or any other basis that is meaningful to the school or community served by the school.

Once the routes are generated with children assigned to a particular bus, server 135 may transmit bus information to user device 115 by fleet routing system 100. Bus information may include bus stop information for picking up a child and a time for pick up at the bus stop. User device 115 may be associated with the child bus rider or with a parent of the child bus rider. User device 115 may be implemented as separate devices where one device is associated with the child rider and another device is associated with a parent, guardian, or other supervisor of a child. When the school bus is operating, a real time location may be provided to user device 115 so that the child and child supervisor may identify where the bus is currently located. A child or child supervisor may use user device 115 to create the child profile discussed above by providing information from user device 115 through communications network 105 to server 135.

Further, once the routes are generated, server 135 may transmit individual route information to a bus driver via driver device 120, in fleet routing system 100. Individual route information may be a mandatory bus route for the driver to follow with a stop sequence that is identified along the individual route. Individual route information may include turn by turn instructions with expected drive time duration and distance for the bus driver. Driver device 120 may also detect information from a particular bus drive and provide that information to server 135 through communication network 135. Information provided from driver device 120 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by server 135 to optimize routing. In one embodiment, driver device 120 may receive an optimized route from server 135 for picking up children based on a home or a school address and/or prior pickup/drop off history locations for children on a particular route. In another embodiment, driver device 120 may further be optimized to prevent U-turns, enforce curbside pickup to avoid children crossing streets. Server 135 may receive information from driver device 120 which it may use to optimize routes based on learning from past driver routes to determine a best path between stops. Server 135 may receive information from driver device 120 which may optimize based on learned roadblocks and driver input to driver device 120 with new information (e.g., a street closure or construction) which causes server 135 to reoptimize the bus route. Server 135 may use information to determine and store driving instructions at the ride route level for a particular bus and driver device 120. Server 135 may track a bus via driver device 135 during a pickup or drop off ride and ensure compliance with the optimized route. If driver device 120 indicates that a bus is not following optimized route information, server 135 may send a message to ride requestor device 110, administrator device 125, or provider device 130 to allow either the ride requestor, the administrator, or the provider to contact the bus driver with route correction instructions.

Based on information received from driver device 120, server device 135 may maintain estimated global positioning system ("GPS") waypoints and an estimated time of arrival ("ETA") information for each ride, which may be constantly updated based on information provided by driver device 120. Driver device 120 may further provide real time routing, navigation, and path information based on a current location of driver device 120. Routing, navigation, and path information may be displayed on a screen associated with driver device 120. The user may receive, via user device 115, expected vehicle path information on a map displayed on a screen of user device 115. Thus, a user of user device 115 may be able to track bus 120 in real time and observe where a bus is currently and when a bus will be at a specific stop, which may be identified by waypoints provided to the user from server 135 via user device 115. Any data received from driver device 120 may be stored as historical data which may be used to further optimize bus routing on a permanent or temporary basis depending on road conditions, pickup/drop off requirements, and any other factor identified herein.

Ride requestor device 110, user device 115, driver device 120, administrator device 125, and provider device 130 may be implemented as any electronic device with processing power sufficient to share electronic information back and forth through communications network 105. Examples of ride requestor device 110, user device 115, driver device 120, administrator device 125, and provider device 130 include mobile phones, desktop computers, laptop computers, tablets, game consoles, personal computers, mobile devices, notebook computers, smart watches, and any other digital device that has the processing ability to interact with server 135.

Ride requestor device 110, user device 115, driver device 120, administrator device 125, and provider device 130 may include software and hardware modules that execute computer operations, communicate with communication networks 105 and server 135. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within ride requestor device 110, user device 115, driver device 120, administrator device 125, and provider device 130, are used to connect with server 135.

Server 135 may provide web-based access to fleet routing system 100 (or relevant portions based on which device is associated with a particular function—e.g., a parent using user device 115 may not have permissions to reroute buses) to ride requestor device 110, user device 115, driver device 120, administrator device 125, and provider device 130. Communication network 105 may be a wired, wireless, or both and facilitate communications in fleet routing system 100. Server 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing and communication for web based fleet routing system 100. Server computer 135 may be implemented as one or more actual devices but are collectively referred to as server computer 135 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within one or more server 135 may be used to execute the various methods or algorithms disclosed herein, and interface with ride requestor device 110, user device 115, driver device 120, administrator device 125, and provider device 130.

In one embodiment, ride requestor device 110, user device 115, driver device 120, administrator device 125, and provider device 130 may access server 135 by a communication network 105. In each case, wireless communication network 135 connects ride requestor device 110, user device 115, driver device 120, administrator device 125, and provider device 130 via an internet connection provided by communication network 105. Any suitable internet connection may be implemented for wireless communication network 105 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, ride requestor device 110, user device 115, driver device 120, administrator device 125, and provider device 130 and server 135.

Figure 2:
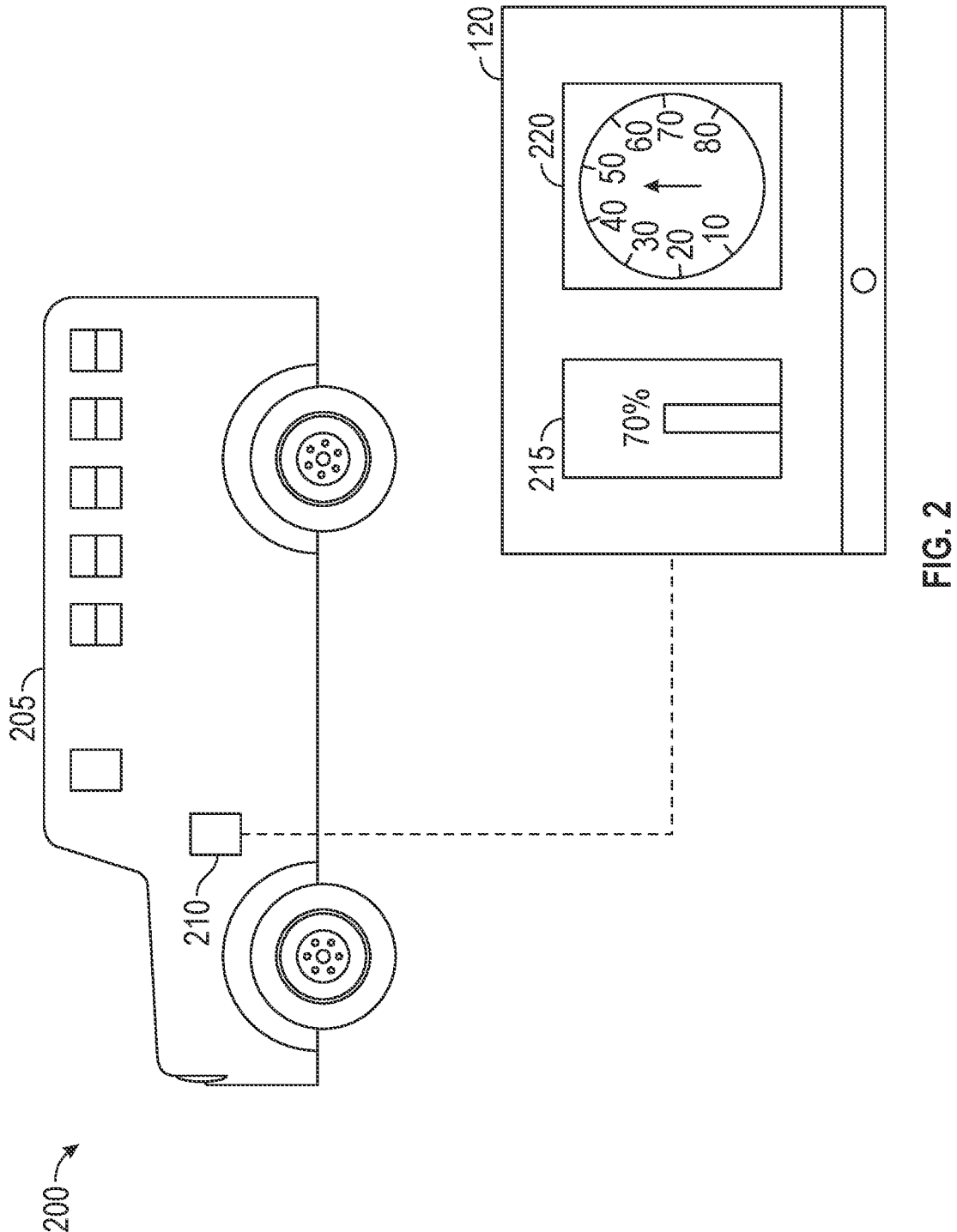
FIG. 2 illustrates an exemplary system for a driver device to obtain vehicle information for display on the driver device.

FIG. 2 illustrates an exemplary system 200 providing for a driver device 120 to obtain vehicle information for display on driver device 120. System 200 may include a vehicle 205, such as a bus for purposes of explanation only (this disclosure is not limited to buses or any specific vehicle nor is this disclosure limited to picking up and delivering passengers to a certain location. This disclosure may also apply to delivery of goods or other purposes for which fleet vehicles are used which are known to those of ordinary skill in the art). Vehicle 205 may include an onboard computing device 210 which may be implemented as a computer processor with memory for executing computer instructions. Computing device 210 may itself include communication circuitry which may allow computing device 210 to connect by connection network 105 to any of the devices shown in fleet routing system 100, but most especially server device 135. Computing device 210 may further connect by communication circuitry with driver device 120 using any of the protocols discussed herein, to provide vehicle information to driver device 120. Driver device 120 may also use any of the protocols herein to provide vehicle information received from computing device 210 to another device within routing system 100, but most especially server device 135 through communication network 105.

As shown in FIG. 2, computing device 210 provides vehicle information to driver device 120. Vehicle information may include information about the vehicle and its characteristics. For example, visual display interfaces 215 and 220 may provide information about the vehicle's current condition. In this particular example, visual display interface 215 illustrates that vehicle 205 is an electric vehicle with 70% of its charge remaining while visual display interface 220 shows a current speed of the vehicle. Other information may be shared by driver device 120 with server 135 through communications network 105 including information about the battery status of driver device 120 as well as a lack of a charger to charge driver device 120, that the vehicle is low or out of gas, a GPS location of the vehicle, the time of travel between certain locations identified by the GPS location of the vehicle, pickup location information, drop off location information, traffic delays, network connectivity issues, GPS location issues, unexpected stops have occurred, a ride is proceeding in the wrong direction, an vehicular accident has occurred, an emergency condition exists on the bus, or that a particular pickup or drop off location was skipped. Information such as a home location, in this example for a child, the type of home where the stop occurs (e.g., a large apartment complex expected to have many children to ride the bus), time to load or unload children, pickup locations based on historical data based on latitude/longitude coordinates, scheduled stops, or GPS, expected idle time at schools, and driver data, such as daily check in time, may all be provided to or from computing device 210 to server 135 via communication network 105 to improve timing estimates. Any data generated by computing device 210 known to those of ordinary skill in the art and any data generated by driver device 120 known to those of ordinary skill in the art may be transmitted to fleet routing system 100 either directly to each individual device or to server 135 through communication network 105.

Figure 3:
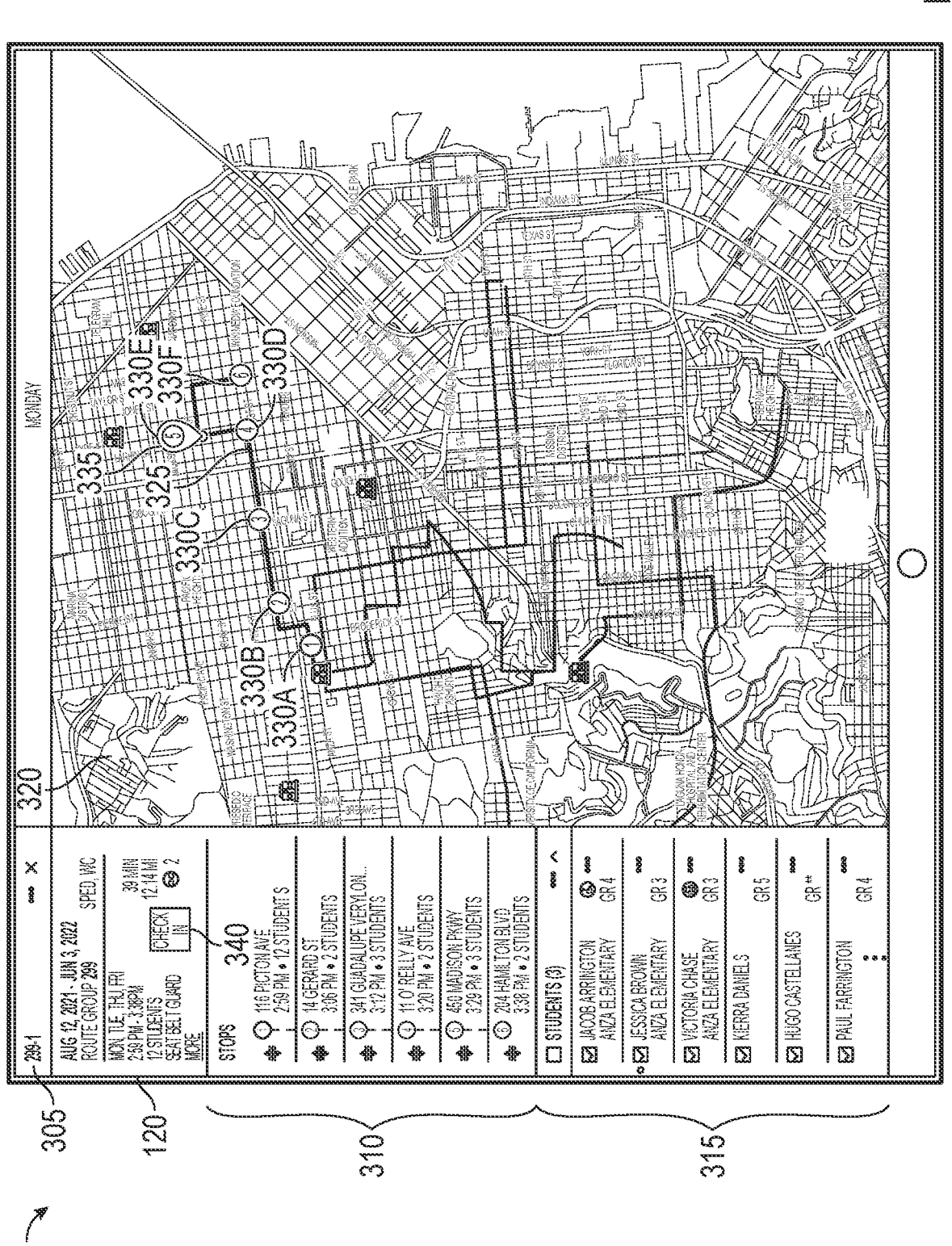
FIG. 3 illustrates an exemplary embodiment of a graphical user interface for a driver device.

FIG. 3 illustrates an exemplary embodiment of a graphical user interface 300 for a driver device 120. Graphical user interface 300 is provided on driver device 120 to provide the driver with relevant information to service an assigned route. Graphical user interface 300 includes an information interface 305 which includes an identification of a particular route, 299-1, dates and days the route is to be provided, the timing for the route, the distance of the route, the duration of the route, and the number of students to be picked up, in this example, on this particular route. As shown in information interface 305, Route 299-1 is intended to run from Aug. 12, 2021, to Jun. 3, 2022 (using a past date as test data), on Mondays, Tuesdays, Thursdays, and Fridays. Route 299-1 runs from 2:59 PM to 3:38 PM for a total duration of 39 minutes over 12.14 miles. Route 299-1 is intended to, in this example, take children home from school. A driver may check-in to drive the route by interacting with button 340 to indicate that the driver is in position to service the route.

Graphical user interface 300 further includes stop location interface 310 which identifies the number of stops, the location of the stops, the time of the stops, the order of the stops, and the number of students to be dropped off per stop. For example, stop location interface 310 provides a first stop at 116 Picton Avenue, which may be identified with a particular indicator such as a color, that the first stop is a school called Anza Elementary School. The first stop is to be conducted at 2:59 P.M and is intended to pick up 12 students. From there, the driver and bus or vehicle are to proceed to stop two at 14 Gerard St. by 3:06 PM and drop off 3 students. The driver and bus then proceed to the next stop at 341 Guadalupe VeryLon by 3:12 P.M to drop off 3 students. The next stop is at 11 O'Reilly Ave at 3:20 PM where two students are dropped off. The next stop is at 450 Madison Pkwy at 3:29 PM where three students are dropped off. The final stop is at 205 Hamilton Blvd at 3:38 PM where the remaining two students are dropped off. Stop location interface may include an indicator 335 of where in the list of stops the vehicle is located within stop location interface 310, as will be discussed below.

Graphical user interface 300 may further include a student identification interface 315 which includes information about each child that should be riding on that particular vehicle. For example, Jacob Arrington is a 4$^{th}$ grader at Anza Elementary, Jessica Brown is a 3$^{rd}$ grader at Anza Elementary, Kierra Daniels is a 5$^{th}$ grader at Anza Elementary, Hugo Castellanos is a kindergartner at Anza Elementary, Paul Farrington is a 4$^{th}$ grader at Anza Elementary, as well as others. Each of the 12 riders identified in stop location interface 310 may be identified by name and grade with a profile that will be discussed below. In this manner, however, driver device 120 may provide information to the driver to ensure that each student is being dropped off at the correct stop after school, as will be discussed below in more detail.

Graphical user interface 300 may further include a map 320 illustrating the particular day for route 299-1 as being a Monday. Route 299-1 may be identified on the map as route 325. Each one of the stop locations 320A-320F identified in stop location interface 310 are illustrated on map 325 with an indicator of stop order (e.g., 1, 2, 3, 4, 5, etc.) In this manner the driver may ensure that each child is dropped off at the correct stop in the correct order to optimize the driving of the route.

Also provided in graphical user interface is a location indicator, such as location indicator 335 which may be GPS information about a current location of a vehicle. As shown on map 320, the vehicle driving route 325 is currently at stop 5, 450 Madison Pkwy, as indicated by indicator 335. Indicator 335 may also be illustrated in stop location interface 310 to show where the vehicle is in process of completing route 325.

Figure 4:
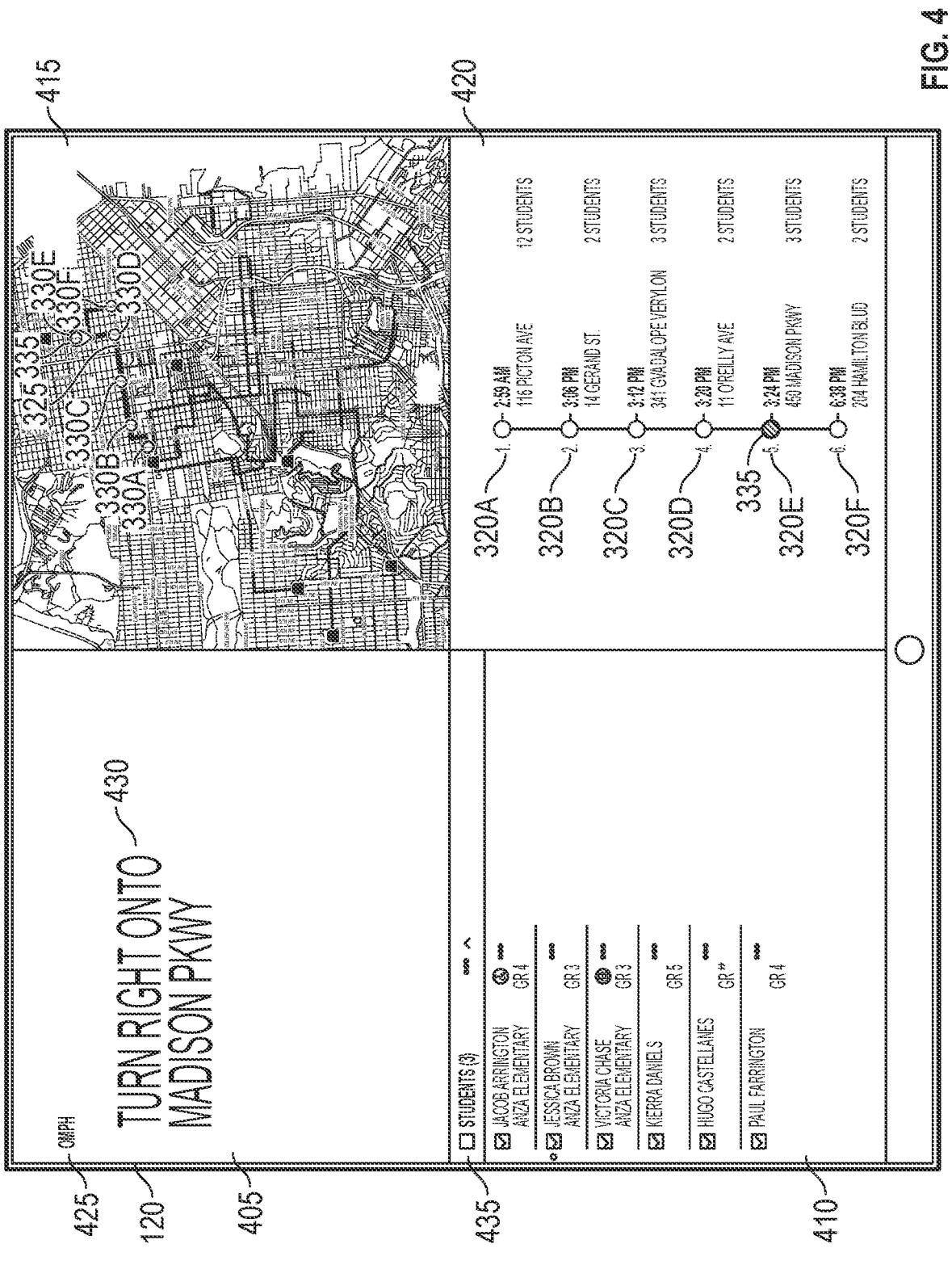
FIG. 4 illustrates an exemplary embodiment of a user interface for a driver device.

FIG. 4 illustrates an exemplary embodiment of a user interface 400 for a driver device 120. User interface 400 may be displayed in combination with user interface 300 or include user interface elements 215 and 220 shown in FIGS. 2 and 3, respectively. User interface 400 merely illustrates other functionalities offered to a driver device through fleet routing system 100. For example, user interface 400 may include a navigation pane 405, a student information pane 410, a map pane 415, and a timeline view pane 420.

Navigation pane 405 may provide navigation information to a driver of a vehicle during operation of the vehicle. For example, navigation pane 405 may include vehicle speed information 425 as well as turn by turn navigation information 430. The navigation information may be optimized to provide a route for a specific vehicle, such as a school bus, in order to facilitate a speed of performing the route and ensure that, in this example, children are dropped off safely.

Student information pane 410 may provide a list of students who should be riding the bus during a route. This list is similar to student information interface 315, shown in FIG. 3 and identifies all 12 children who should be on a bus traversing the prescribed route. Similarly, map pane 415 may be similar to map 320 shown in FIG. 3 and illustrate each stop 330A-330F on map 320. Map 320 may include indicator 335 identifying a current location of the vehicle on the route.

Timeline view pane 420 may provide a timeline view of route 325 shown in map pane 415. Timeline view pane 420, for example, may identify stops 320A-320F in order, by address, and, in this example, a number of students who should board or exit a bus at a particular stop. For example, stop one is to be conducted at 2:59 P.M and is intended to pick up 12 students. From there, the driver and bus or vehicle are to proceed to stop two at 14 Gerard St. by 3:06 PM and drop off 3 students. The driver and bus then proceed to stop three at 341 Guadalupe VeryLon by 3:12 P.M to drop off 3 students. Stop four is at 11 O'Reilly Ave at 3:20 PM where two students are dropped off. Stop 5 is at 450 Madison Pkwy at 3:29 PM where three students are dropped off. Stop 6 is at 205 Hamilton Blvd at 3:38 PM where the remaining two students are dropped off. Stop location interface may include an indicator 335 of where in the list of stops the vehicle is located within stop location interface 310.

As discussed above, a stop time may be associated with each one of stops 320A-320F. These times may be based on an estimated time of arrival ("ETA") based on historical data and current data used to estimate when a vehicle may arrive at a particular one of stops 320A-320F. The ETA may further depend on delays experienced by the vehicle. For example, if a child is not identified (e.g., is late to the bus) in this example, or did not confirm pickup or drop off with driver device 120, as will be discussed below. ETA may be updated based on a current location and time of a vehicle or if unpredictability exists based on a driver missing a turn or a road condition exists, as necessary. The ETA may be further updated based on a skipped pickup/drop off (e.g., a pickup or drop off missed by the driver of the vehicle), or if the stops are not performed in the specified order. A correct ETA may be useful to, for example, a user of user device 115 so that a user, a parent in this example, may plan to arrive to meet the bus and not wait for the bus to arrive with their child. The ETA may be communicated from the driver device to ride requestor device 110, administrator device 125, provider device 130 and/or server 135 through communication network 105 to ensure that user device 115 is updated on the ETA status of a particular route, especially when delays or unexpected speedups have changed the ETA from normal expectations.

Figure 5:
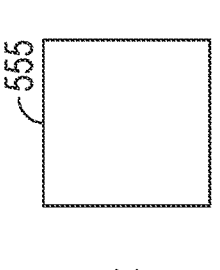
FIG. 5 illustrates an exemplary system of a driver device receiving rider information.
Figure 5:

FIG. 5 illustrates an exemplary system 500 of a driver device 120 receiving rider information from an identification device 555. Driver device 120 may provide a child profile 505, discussed with respect to FIG. 1 as provided via user device 115, which includes information about a child riding a bus, in this example. For example, child profile 505 may include a picture of the child 410, child name information 515, child grade information 520, child elementary school 525, child parent name 530, and child parent phone number. Driver device 120 may further provide indicators of whether or not the child has boarded the bus in indicator 540, not boarded the bus in indicator 545, or is "on hold" in indicator 550. An "on hold" indicator may refer to a child who did not have a responsible adult at the stop when the bus arrived who was to receive the child. For example, if Jane Brown was not at stop 5, 320E shown in FIG. 3, at 3:29 PM, a driver may interact with indicator 550 to identify through communication network 105 and server device 135 to user device 115 that Jessica Brown is "on hold" and will be re-delivered after stop 6 has been completed.

Each student, good, or package associated with fleet routing system 100 may be provided with or be subject to an identification device 555. Identification device 555 may, in one embodiment, be carried by a child and provide a signal to user device 120 that uniquely identifies the child to the system. For example, identification device 555 may be an RFID card which may produce a signal to driver device 120 that Jessica Brown is boarding or disembarking from a bus, for example. Identification device 555 may be a personal device, such as a smartphone or any other portable electronic device which emits a signal that uniquely identifies a child to driver device 120. In one embodiment, the personal device may emit a sound wave of a specific frequency to uniquely identify a child to driver device 120. In another embodiment, identification device 155 may be implemented as a camera associated with facial recognition technology provided within the vehicle. In this manner, the facial recognition technology may identify Jessica Brown based on facial recognition and indicate to driver device 155 that Jessica Brown has boarded a bus, in this example. Identification device 555 provides a unique identifier in any of the foregoing ways by a communication signal 560 provided to driver device 155.

A plurality of benefits is associated with system 500. For example, custody of a child, or good, may be constantly monitored by multiple users of fleet routing system 100. In one embodiment, a child boarding the wrong bus may be identified and redirected to the appropriate bus to ensure the child is delivered to the right stop. A parent using user device 115 may see, in real time, that a child was or was not picked up by a bus for conveyance to or from a location. Driver device 120 may further indicate to the driver that a certain child is not expected on a particular day due to illness or other absence from school or, alternatively, may be made aware by a parent using user device 115 that the parent has canceled the child's ride on the bus. Driver device 120 may, in that case, prevent the child from boarding the bus incorrectly against the parent's wishes. Another advantage is that server 135 may, in one example, identify that a particular child on a particular bus is moving the wrong direction and notify the bus driver that a child has boarded the incorrect bus. A bus driver, for example, may also be able to identify the children that should be on the bus even in a location where a large number of buses are located at the same time (e.g., after school or during a field trip, for example). Driver device 120 may further be agnostic to a particular driver in case a certain driver is absent and needs to be substituted from another driver who does not know the children boarding the bus.

Figure 6:
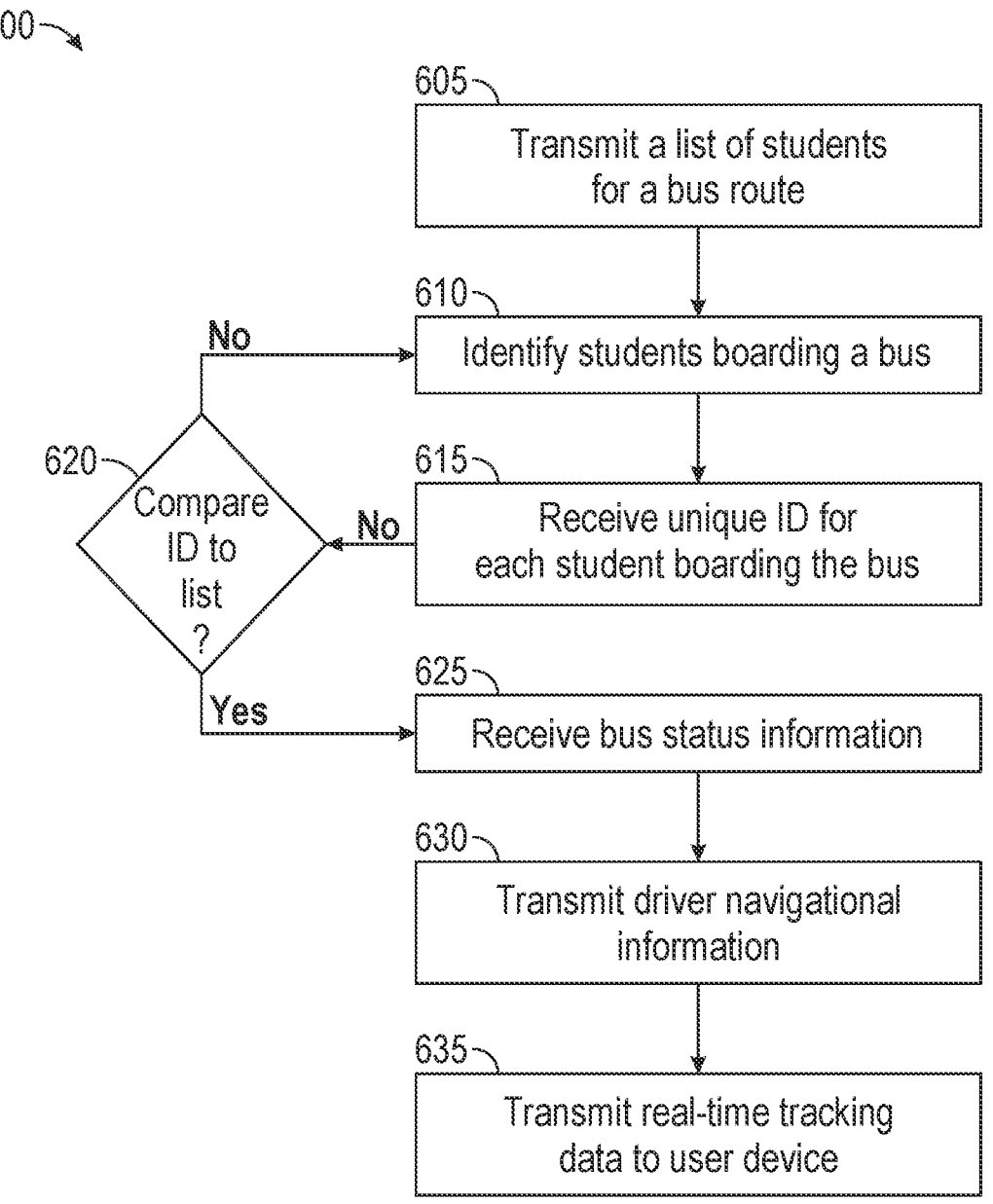
FIG. 6 illustrates a method for ride monitoring.

FIG. 6 illustrates method 600, for ride monitoring. Method 600 begins by transmitting a list of students to, for example, driver device 120, which includes a list of students for a bus route at step 605. The list of students may be similar to student information interface 315 shown in FIG. 3 or in student information interface 410 shown in FIG. 5. The list of students may identify students who are assigned to a particular bus serving a particular bus route at step 610. Server 135 may, by driver device 120, receive a unique identification for each student boarding the bus at step 615 and compare the unique identification to the list of students identified for the route in step 620 (615—No). If the unique identification matches a student identified in the list, (620—Yes), method 600 may receive bus status information at step 625 from driver device 120 about the status and location of the bus. Server 135 may, in response, transmit driver navigational information to driver device 120 at step 630. Server 135 may further transmit real time tracking data to a user device at step 635.

If a child boarding the bus is not uniquely identified at step 615 (615—No), server 135 may compare the child to the list transmitted in step 605. If the student is not included in the list (Step 620—No) the child must be identified at step

610 through driver device 610 to ensure that the child is boarding the correct bus and is going to the destination scheduled for the bus by the route. In this manner, a parent may ensure in real time that a child is safely conveyed to an intended destination.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:

a server device, the server device including a processor, wherein the processor:

transmits a list of passengers for a vehicle route assigned to a vehicle along with an estimated time of arrival for a set of stops on the vehicle route, the list of passengers including digital profiles for each one of the passengers and a number of passengers scheduled to board or disembark the vehicle at each one of the set of stops, calculates the estimated time of arrival for the set of stops on the vehicle route based at least on a specified order for the set of stops, the number of passengers scheduled to board or disembark the vehicle at each one of the set of stops, historical data associated with the set of stops and real-time data received from the vehicle;

receives a unique identification for a passenger boarding the vehicle;

compares the unique identification for the passenger boarding the vehicle to the list of passengers for the vehicle route;

confirms that the passenger has boarded a correct vehicle to which the passenger is assigned and, when the passenger has not boarded the correct vehicle, sends a notification to a driver device that the passenger has not boarded the correct vehicle;

identifies the passenger boarding the vehicle as being on board the vehicle in the digital profile for that passenger;

provides access to the digital profile of the passenger to a person monitoring the passenger;

receives vehicle status information from an onboard computing device in the vehicle;

transmits driver navigational information to the driver device;

identifies a modification to the specified order of the set of stops on the vehicle route;

generates revised driver navigational information for a remaining set of stops based on the modification;

calculates a revised estimated time of arrival for the remaining set of stops on the vehicle route based on the modification, a skipped pickup/drop-off of a passenger scheduled to board or disembark the vehicle, and historical data associated with the remaining set of stops;

transmits the revised driver navigational information and the revised estimated time of arrival to the vehicle;

generates real-time tracking data based on the vehicle status information;

updates, based upon detecting the passenger has not disembarked, the digital profile of the passenger to indicate the passenger has not disembarked;

identifies a modification to the specified order of the set of stops on the vehicle route based on the update to the digital profile of the passenger;

generates revised driver navigational information for a remaining set of stops based on the modification; and transmits the real-time tracking data and the revised estimated time of arrival to a user device, the real-time tracking data including a map with an indicator of a current location of the vehicle.

2. The system of claim 1, wherein the server device further transmits the real-time tracking data to at least one of a ride requestor device or an administer device.

3. The system of claim 1, wherein the vehicle status information includes a current location of the vehicle.

4. The system of claim 1 wherein the vehicle status information includes speed information about the vehicle.

5. The system of claim 1, wherein the vehicle status information includes an estimated time of arrival for one or more stops.

6. The system of claim 1, further comprising transmitting by the server device and to the driver device a timeline view of the vehicle route.

7. The system of claim 6, wherein the timeline view of the vehicle route further includes a location indicator of the current location of the vehicle.

8. The system of claim 7, wherein the timeline view of the vehicle route further includes an estimated time of arrival for one or more stops.

9. The system of claim 6, wherein the timeline view of the vehicle route further includes the number of passengers to board or disembark the vehicle at each one of the set of stops based on the list of passengers assigned to the vehicle, along with identifying information for each passenger.

10. A method, comprising:

transmitting, by a processor of a server device, a list of passengers for a vehicle route assigned to a vehicle along with an estimated time of arrival for a set of stops on the vehicle route, the list of passengers including digital profiles for each one of the passengers and a number of passengers scheduled to board or disembark the vehicle at each one of the set of stops;

calculating the estimated time of arrival for the set of stops on the vehicle route based at least on a specified order for the set of stops, the number of passengers scheduled to board or disembark the vehicle at each one of the set of stops, historical data associated with the set of stops and real-time data received from the vehicle;

receiving, by the processor of the server device, a unique identification for a passenger boarding the vehicle;

comparing, by the processor of the server device, the unique identification to the list of passengers for the vehicle route;

confirming, by the processor of the server device, that the passenger has boarded a correct vehicle to which the passenger is assigned and, when the passenger has not boarded the correct vehicle, the processor of the server device sends a notification to a driver device that the passenger has not boarded the correct vehicle;

identifying, by the processor of the server device, the passenger boarding the vehicle as being on board the vehicle in the digital profile for that passenger;

providing, by the processor of the server device, access to the digital profile of the passenger to a person monitoring the passenger;

receiving, by the processor of the server device, vehicle status information from an onboard computing device in the vehicle via the driver device;

transmitting, by the processor of the server device, driver navigational information to the driver device;

identifying, by the processor of the server device, a modification to the specified order of the set of stops on the vehicle route;

generating, by the processor of the server device, revised driver navigational information for a remaining set of stops based on the modification;

calculating, by the processor of the server device, a revised estimated time of arrival for the remaining set of stops on the vehicle route based on the modification, a skipped pickup/drop-off of a passenger scheduled to board or disembark the vehicle, and historical data associated with the remaining set of stops;

transmitting, by the processor of the server device, the revised driver navigational information and the revised estimated time of arrival to the vehicle;

generating, by the processor of the server device, real-time tracking data based on the vehicle status information;

updating, by the processor of the server device, based upon detecting the passenger has not disembarked, the digital profile of the passenger to indicate the passenger has not disembarked;

identifying, by the processor of the server device, a modification to the specified order of the set of stops on the vehicle route based on the update to the digital profile of the passenger;

generating, by the processor of the server device, revised driver navigational information for a remaining set of stops based on the modification; and transmitting, by the processor of the server device, the real-time tracking data and the revised estimated time of arrival to a user device, the real-time tracking data including a map with an indicator of a current location of the vehicle.

11. The method of claim 10, further comprising: transmitting the real-time tracking data to a ride requestor device.

12. The method of claim 10, further comprising: transmitting the real-time tracking data to an administrator device.

13. The method of claim 10, wherein the vehicle status information includes a current location of the vehicle.

14. The method of claim 10, wherein the vehicle status information includes speed information about the vehicle.

15. The method of claim 10, wherein the vehicle status information includes an estimated time of arrival for one or more stops.

16. The method of claim 10, further comprising transmitting by the server device and to the driver device a timeline view of the vehicle route.

17. The method of claim 16, wherein the timeline view of the vehicle route further includes a location indicator of the current location of the vehicle.

18. The method of claim 17, wherein the timeline view of the vehicle route further includes an estimated time of arrival for one or more stops.

19. The method of claim 17, wherein the vehicle is an electric vehicle, and the vehicle status information received at the server device includes an electrical charge of the vehicle.

20. The method of claim 16, wherein the timeline view of the vehicle route further includes the number of passengers scheduled to board or disembark the vehicle at each one of the set of stops based on the list of passengers assigned to the vehicle, along with identifying information for each passenger.

\* \* \* \* \*